United States Patent [19]

Wosaba, II et al.

[11] Patent Number: 4,871,345

[45] Date of Patent: Oct. 3, 1989

[54] METHOD OF MAKING TEAR STRIP OPENABLE SHIPPING/DISPLAY CONTAINER AND BLANKS THEREFOR

[75] Inventors: Charles L. Wosaba, II; Peter W. Hamilton; Robert J. Kissner, all of Cincinnati, Ohio

[73] Assignee: The Procter & Gamble Company, Cincinnati, Ohio

[21] Appl. No.: 226,694

[22] Filed: Aug. 1, 1988

Related U.S. Application Data

[62] Division of Ser. No. 123,098, Nov. 20, 1987, Pat. No. 4,784,271.

[51] Int. Cl.[4] .................. B31B 1/90; B31B 1/18
[52] U.S. Cl. .................. 493/59; 493/67; 493/68; 493/346; 493/963
[58] Field of Search .................. 493/59, 67, 68, 84, 493/377, 963, 346, 381

[56] References Cited

U.S. PATENT DOCUMENTS

| | | | |
|---|---|---|---|
| 900,953 | 10/1908 | Reber . | |
| 956,859 | 5/1910 | Lauterbach | 206/616 |
| 1,262,992 | 4/1918 | Stephano . | |
| 1,570,682 | 1/1926 | Kling . | |
| 1,649,211 | 11/1927 | Bitzer . | |
| 1,724,224 | 8/1929 | Schroeder . | |
| 1,815,800 | 7/1931 | Respess . | |
| 1,896,400 | 2/1933 | Gaseltine | 206/617 X |
| 1,914,845 | 6/1933 | Cook | 229/199 |
| 2,053,529 | 9/1936 | Nelson | 229/51 |
| 2,085,062 | 6/1937 | Allen | 206/627 X |
| 2,352,766 | 7/1944 | Bogue | 206/616 |
| 2,517,801 | 8/1950 | Roush | 206/616 |
| 2,614,745 | 10/1952 | Fallert et al. | 229/27 |
| 2,706,076 | 4/1955 | Guyer | 229/51 |
| 2,751,964 | 6/1956 | Guyer | 154/33.05 |
| 2,789,752 | 4/1957 | Will | 206/607 |
| 2,790,594 | 4/1957 | Hultkrans et al. | 229/87 |
| 2,829,701 | 4/1958 | Keely | 154/31 |
| 2,870,953 | 1/1959 | Parker et al. | 229/51 |
| 2,895,865 | 7/1959 | Humphner | 154/53.5 |
| 2,909,312 | 10/1959 | Conerty | 229/51 |
| 2,985,287 | 5/1961 | Schulz | 206/46 |
| 3,069,062 | 12/1962 | Keith | 229/37 |
| 3,124,246 | 3/1964 | Remer et al. | 206/56 |
| 3,136,474 | 6/1964 | Schaus et al. | 229/51 |
| 3,137,437 | 6/1964 | Svensson | 229/51 |
| 3,145,840 | 8/1964 | Wright | 206/617 X |
| 3,189,251 | 6/1965 | McFarland | 229/51 |
| 3,203,618 | 8/1965 | Andrews et al. | 229/40 |
| 3,241,739 | 3/1966 | Ahlemeyer | 229/51 |

(List continued on next page.)

FOREIGN PATENT DOCUMENTS

| | | | |
|---|---|---|---|
| 752763 | 9/1933 | France | 206/617 |
| 550937 | 11/1956 | Italy | 206/617 |
| 108615 | 3/1966 | Norway | 206/627 |
| 1194016 | 6/1970 | United Kingdom | 206/617 |

Primary Examiner—Frederick R. Schmidt
Assistant Examiner—Jack W. Lavinder
Attorney, Agent, or Firm—John J. Ryberg; E. Kelly Linman; John V. Gorman

[57] ABSTRACT

A shipping carton or container that can be readily opened and converted into a display tray without having to use a knife or other sharp instrument. The carton is formed from a blank having four sidewalls and hingedly connected top and bottom end panels. The sidewalls have a line of severance running circumferentially around the carton that defines a continuous butt joint separating the carton into a top cover section and a bottom tray section. A wide tape having a narrow tear filament or strip attached to its inner surface is adhesively attached to the sidewalls' outer surface such that it bridges the butt joint and holds the carton's top and bottom sections together, the tear strip being substantially superimposed over the butt joint. Pulling the tear filament neatly splits the wide tape and separates the carton's top and bottom sections.

12 Claims, 4 Drawing Sheets

U.S. PATENT DOCUMENTS

| | | | |
|---|---|---|---|
| 3,276,665 | 10/1966 | Rasmussen | 229/51 |
| 3,276,666 | 10/1966 | Johnson | 229/51 |
| 3,276,667 | 10/1966 | Johnson et al. | 229/51 |
| 3,291,372 | 12/1966 | Saidel | 229/51 |
| 3,314,587 | 4/1967 | Johnson | 229/27 |
| 3,342,398 | 9/1967 | Keith | 229/16 |
| 3,343,746 | 9/1967 | Shiffman | 229/51 |
| 3,438,563 | 4/1969 | Collura et al. | 206/616 X |
| 3,447,733 | 6/1969 | Smith et al. | 229/37 |
| 3,469,766 | 9/1969 | Nelson | 229/51 |
| 3,504,844 | 4/1970 | Stark et al. | 229/51 |
| 3,519,194 | 7/1970 | Kohlhaas et al. | 229/51 |
| 3,529,764 | 9/1970 | Reeves et al. | 229/51 |
| 3,531,045 | 9/1970 | Johnson | 229/51 |
| 3,539,093 | 11/1970 | Massengill | 229/51 |
| 3,566,752 | 3/1971 | Dreher | 93/1 |
| 3,661,318 | 5/1972 | Miller et al. | 229/23 BT |
| 3,810,800 | 5/1974 | Doll | 493/68 |
| 3,810,813 | 5/1974 | Ellis | 161/145 |
| 3,823,866 | 7/1974 | Elward et al. | 229/51 TS |
| 3,826,421 | 7/1974 | Morse et al. | 229/51 AS |
| 3,850,363 | 11/1974 | Jacobs | 229/51 R |
| 3,910,482 | 10/1975 | Bamburg et al. | 220/441 |
| 3,951,333 | 4/1976 | Forbes Jr., et al. | 206/607 |
| 4,328,924 | 5/1982 | Neff et al. | 229/43 |
| 4,558,785 | 12/1985 | Gordon | 206/617 |
| 4,606,462 | 8/1986 | Bogren | 206/606 |
| 4,621,736 | 11/1986 | Roccaforte | 206/616 X |
| 4,697,699 | 10/1987 | Schneider | 206/44.11 |

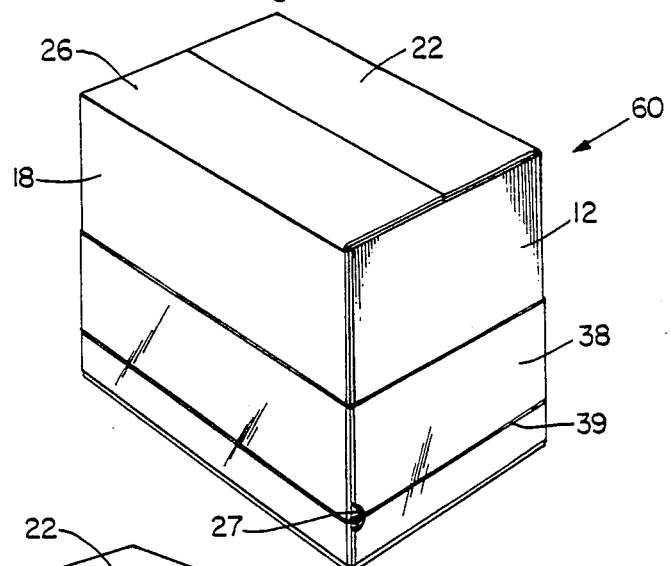
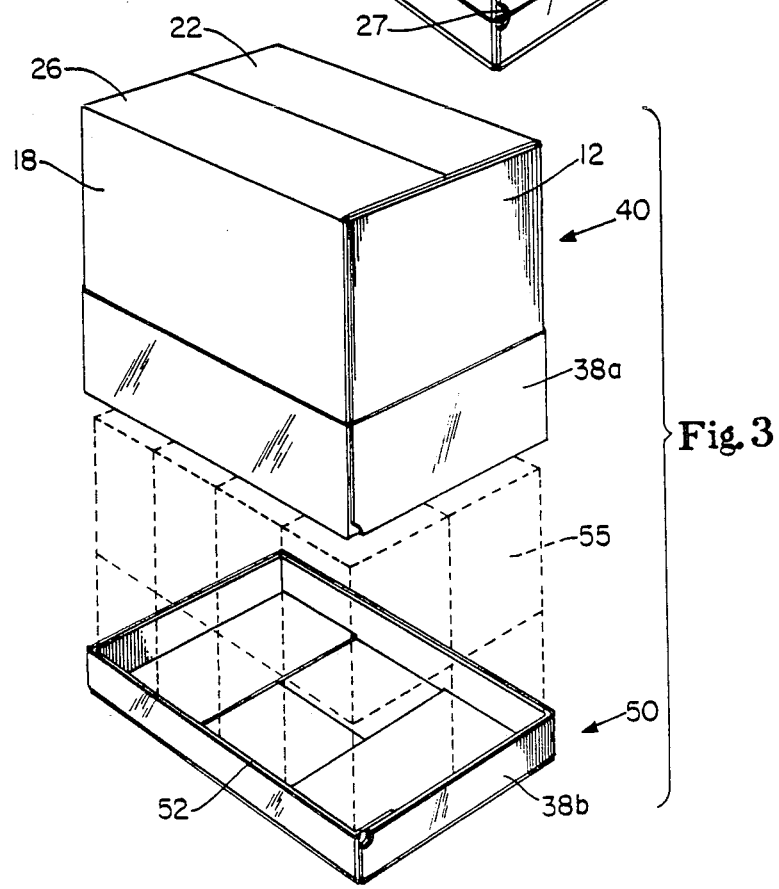

METHOD OF MAKING TEAR STRIP OPENABLE SHIPPING/DISPLAY CONTAINER AND BLANKS THEREFOR

This is a division of U.S. application Ser. No. 123,098 filed on Nov. 10, 1987, now U.S. Pat. No. 4,784,271.

TECHNICAL FIELD

The present invention relates to shipping containers and cartons, and more particularly relates to shipping containers and cartons that are intended to be converted into a display after opening at the final destination point. The present invention is further related to shipping containers and cartons that can be readily opened without having to use a knife or other sharp instrument.

BACKGROUND OF THE INVENTION

In the consumer products industry, individual products are typically placed in large containers or cartons that are shipped to retail establishments such as supermarkets. When a shelf needs to be stocked with additional product, an employee usually brings a full carton to the shelf, opens it, price marks each product inside, and places them one-by-one on the shelf, which is very time consuming.

In many instances, retail establishments prefer shipping containers that can be converted into display trays. Advantages of display trays include being able to place many products on a shelf in one motion, and being able to stack several open trays in an aisle if shelf space is not available. One such shipping/display container is a bottom tray filled with product that is shrink-wrapped with a web of thermoplastic film. The container can be opened by puncturing and unwrapping the film which is then discarded. However, most thermoplastic films are not biodegradable and therefore present an environmental concern.

One well-known type of shipping carton that can be converted into a display tray has printed instructions to circumferentially slice the carton's sidewalls along a dotted or dashed line with a knife, razor, or other sharp instrument. In opening the carton in this fashion, it is very easy to accidentally cut too deeply through the carton's walls and into the individual products inside the carton. If the product is solid or granular such as laundry detergent, the damage is generally confined to the outermost packages which, although messy and expensive, is not as catastrophic as slicing into individual containers that house a liquid such as dishwashing detergent. In addition, using a sharp instrument to cut open a carton poses a safety concern.

Others have identified the above-described problems associated with opening shipping cartons with a knife and have proposed various alternatives. For example, U.S. Pat. No. 3,850,363, which issued to Jacobs on Nov. 26, 1974, discloses a shipping carton having a rip cord circumferentially attached to the interior surface of the carton's side walls. Pulling the rip cord tears the carton's side walls and separates the carton into a top section and a bottom section. However, this general type of easy-open shipping carton has been found to be unacceptable for two major reasons; first, if the carton is made of corrugated paperboard and the rip cord is positioned perpendicular to the corrugated flutes, a very large pulling force is needed to split the carton walls; and second, it is nearly impossible to split the carton walls along a straight line which results in a mutilated bottom tray that is substantially weakened and unattractive and therefore generally unacceptable for display purposes.

In light of the above, a major object of the present invention is to provide a shipping container or carton that can be readily opened without having to use a knife or other sharp instrument.

Another object of the present invention is to provide a shipping container or carton that can be readily split along a pre-selected line into a top section and a bottom section, the latter being useful as an attractive display tray having a straight and smooth upper edge.

Yet another object of the present invention is to provide a high-speed manufacturing method of making blanks that are used in erecting shipping containers of the present invention.

Another object of the present invention is to provide blanks that can be erected into shipping containers by using conventional machinery.

These and other objects, advantages, and novel features of the present invention will become apparent to those skilled in the art from the following detailed description with reference to the drawings and appended claims.

SUMMARY OF THE INVENTION

The present invention provides a shipping carton or container that can be readily opened and converted into a display tray without having to use a knife or other sharp instrument. The carton is formed from a blank having four sidewalls and hingedly connected top and bottom end panels. The sidewalls have a line of severance running circumferentially around the carton that defines a continuous butt joint separating the carton into a top cover section and a bottom tray section. A wide tape having a narrow tear filament or strip attached to its inner surface is adhesively attached to the sidewalls' outer surface such that it bridges the butt joint and holds the carton's top and bottom sections together, the tear strip being substantially superimposed over the butt joint. Pulling the tear filament neatly splits the wide tape and separates the carton's top and bottom sections. Preferably, one of the carton's sidewalls is provided with an access aperture to make it easier to grasp the end of the rear filament therein.

In another particularly preferred embodiment, the shipping carton is made of corrugated paperboard having an inner liner, a corrugated medium, and an outer liner, all three components being cut along a preselected line. A rip cord is attached to the inner liner's inner surface over the cut line. A wide tape is attached to the outer liner's inner or outer surface, or both, over the cut line. The carton is opened by pulling the rip cord which passes through the cut line and splits the wide tape(s), thereby separating the carton into a top cover section and a bottom tray section. In other particularly preferred embodiments, only the inner medium is pre-cut while the inner or outer liners or both are left intact.

In another particularly preferred corrugated embodiment, the inner liner and corrugated medium are pre-cut along a preselected line. A plurality of high compression/low shear strength rods interconnected with a rip string are placed in the valleys of the corrugated medium, preferably one rod per valley, such that the string is adjacent to the cut line. The carton is opened by pulling the string which snaps each rod and splits the outer liner, thereby separating the carton into a top cover section and a bottom tray section.

BRIEF DESCRIPTION OF THE DRAWINGS

While the specification concludes with claims that particularly point out and distinctly claim the present invention, it is believed that the invention will be better understood by reading the following detailed description with reference made to the following drawings in which:

FIG. 2 is a perspective view of the easy-open, shipping/display carton of the present invention.

FIG. 3 is a perspective view of the easy-open, shipping/display carton of the present invention shown with the top cover portion removed and the carton's contents in phantom.

DETAILED DESCRIPTION OF THE INVENTION

Figure 1:
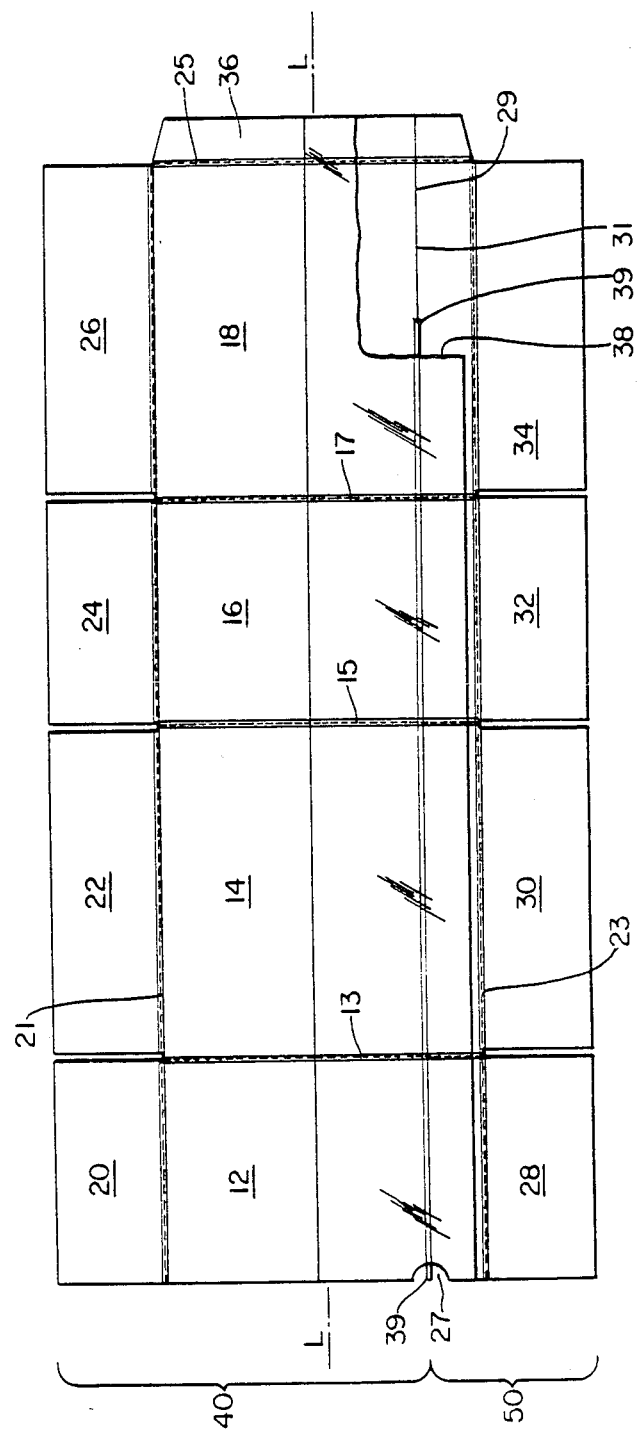
FIG. 1 is a plan view of a blank used in forming the carton shown in FIG. 2, said blank shown with a portion of the tape cut away.

FIG. 1 is a plan view of a blank generally indicated as 10 from which the carton generally indicated as 60 in FIG. 2 is made. In FIG. 1, blank 10, which is generally rectangular or square having a longitudinal axis L, comprises consecutive sidewalls 12, 14, 16, and 18 hingedly connected together at crease lines 13, 15 and 17. Top closure flaps 20, 22, 24, and 26 are hingedly connected to sidewalls 12, 14, 16, and 18, respectively, along common crease line 21. Similarly, bottom closure flaps 28, 30, 32, and 34 are hingedly connected to sidewalls 12, 14, 16, and 18, respectively, along common crease line 23. Manufacturer's glue flap 36 is hingedly connected to the outer edge of sidewall 18 along crease line 25. The outer edge of sidewall 12 is provided with an access aperture 27, the purpose of which to be explained hereinafter.

Preferably, blank 10 is made in a high-speed manufacturing setting wherein a suitable die is used to cut and score blank 10 from a continuous web of relatively stiff and rigid material such as thick paper, paperboard, Kraft paper, or cardboard. In applications where high compression strength is required, e.g., tall stacking in a warehouse, corrugated paperboard is the most preferred material in which case the corrugations or flutes run perpendicular to the blank's longitudinal axis L.

Before blank 10 is scored and severed from the web, blank 10 is cut along line of severance 29 with a stationary or rotary knife which separates blank 10 into a top cover section generally indicated as 40 and a bottom tray section generally indicated as 50. Preferably during and after blank 10 is cut in this fashion, the lower edge of top cover section 40 and the upper edge of bottom tray section 50 are intimately held together to form butt joint 31. Tape 38, which is initially in roll form and has a tear strip or filament 39 adhered to its bottom surface, is unwound and adhered to the outer surface of sidewalls 12, 14, 16, and 18 such that tape 38 bridges butt joint 31 and secures top cover section 40 to bottom tray section 50. Preferably, tape 38 is applied to sidewalls 12, 14, 16, and 18 such that tear strip 39 is substantially superimposed over butt joint 31. Alternatively, tape 38 and tear strip 39 are unrolled from separate rolls and applied one immediately after the other.

Tape 38 can be of any width; however, the bottom edge of tape 38 preferably does not extend below crease line 23 while the top edge of tape 38 extends near the middle of the sidewalls. Tape 38 can be secured to the sidewalls by using, for example, a pressure-sensitive, heat-activated, or water-activated adhesive, and can be made from a wide variety of materials such as paper; a polyolefin such as polypropylene, polyethylene, or polybutalene; nylon; or a polyester such as polyethylene terephthalate (PET) or Mylar ®. If made from a polymer, particularly a polyolefin, tape 38 is preferably oriented in the machine direction to make it easier to split or tear longitudinally while difficult to split laterally.

Tear strip 39 is preferably made from a material having a high tensile strength and high modulus, e.g. an oriented polymer, so that it will not break when pulled, and is substantially narrower than tape 38, e.g., ¼" (6.35 mm) or less. For example, tear strip can be made of 3.0 mil thick plastic having a longitudinal tensile strength of 100 lbs./inch width and 30–50% elongation at failure. In a particularly preferred embodiment, tear strip 39 is reinforced with fiberglass or metal filaments.

Referring to FIG. 2, erected carton generally indicated as 60 is shown having been erected, filled, and closed by using common carton-filling machinery well known to those skilled in the art. Manufacture's glue flap 36 (FIG. 1) can be glued to the outer surface of sidewall 12 instead of its inner surface as shown. As previously noted, the outer edge of one of the sidewalls (here, sidewall 12) is provided with an access aperture 27 which leaves the end of tear strip 39 free and easy to grasp when carton 60 is to be opened.

FIG. 3 shows carton 60 after tear strip 39 has been pulled around the carton's periphery, which cleanly severs tape 38 longitudinally with top portion 38a of tape 38 remaining secured to the outer surface of top cover section 40 and bottom portion 38b of tape 38 remaining secured to the outer surface of bottom tray section 50. AFter tape 38 has been split, top cover portion 40 can be lifted away from bottom tray section 50, thereby exposing the carton's contents 55. Of particular significance is that upper edge 52 of bottom tray 50 is straight and smooth while the outer surface of bottom tray 50, which is covered by bottom portion 38b of tape 38, is not torn up, peeled, or otherwise damaged, which is particularly important if graphics have been printed thereon.

As expected, circumferentially cutting blank 10 into top cover section 40 and bottom tray section 50 and thereafter securing them together with tape 38 decreased the compression strength of finished carton 60 to a certain degree. To compensate for this reduction in compression strength, blank 10 can be made of stronger corrugated material than would otherwise be the case, such as Anvil Board ® available from the International Paper Company, or the individual products placed inside carton 60 can be separated with internal partitions that run vertically from the carton's bottom end panel to its top end panel. Of course, in many applications the individual product packages placed inside the carton can be designed and made of strong material which will take up a significant portion of the load. Carton 60 can be further strengthened by adding vertical supports such as corner posts made of, for example, L-shaped strips of corrugated paperboard.

FIGS. 4-11 are cross-sectional views of carton sidewalls of other particularly preferred embodiments of the present invention. In FIGS. 4-11, the sidewalls are of corrugated construction having inner liner 72, corrugated medium 74, and outer liner 76. However, it is to be understood that the opening features illustrated in these Figures are equally applicable to non-corrugated shipping containers or cartons.

Figure 4:
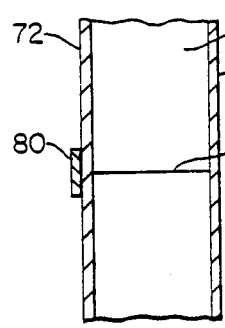
FIG. 4 is a cross-sectional view of the sidewall of a corrugated shipping/display container having a tear strip attached to the inner liner's outer surface, a pre-cut corrugated medium, and an intact outer liner.

In FIG. 4, corrugated medium 74 is severed at cut line 78 while inner liner 72 and outer liner 76 are left intact. A rip cord 80 is secured to the inner surface of inner liner 72 such that it substantially coincides with the location of cut line 78. Rip cord 80 is preferably made from a high tensile strength plastic having a width of between 0.12 and 0.24 inches (3-6 mm) and a thickness of 4.0-5.5 mils (0.10-0.14 mm) such as that available from Rexford Paper Company of Milwaukee, Wisconsin. A shipping/display carton having a sidewall of this construction is opened by pulling rip cord 80 toward and along the outside of the carton such that cord 80 splits inner liner 72 adjacent to cut line 78, passes through cut line 78 in corrugated medium 74, and splits outer liner 76. After cord 80 has been pulled around the circumference of the carton, the cover portion of the carton above cut line 78 is lifted up to reveal the product inside while the portion below cut line 78 remains to serve as a display tray.

Figure 5:
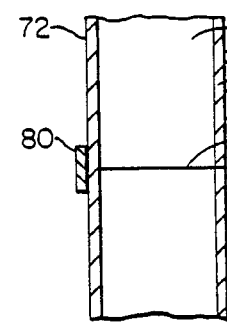
FIG. 5 is a cross-sectional view of the sidewall of a corrugated shipping/display container having a tear strip attached to the inner liner's outer surface, a pre-cut corrugated medium, a pre-cut outer liner, and a wide tape attached to the outer liner's outer surface.
Figure 6:
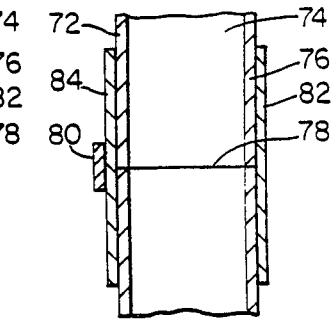
FIG. 6 is a cross-sectional view of the sidewall of a corrugated shipping/display container having a tear strip attached to a wide tape's outer surface; a pre-cut inner liner, corrugated medium, and outer liner; and wide tapes attached to the inner and outer liners' outer surfaces.
Figure 7:
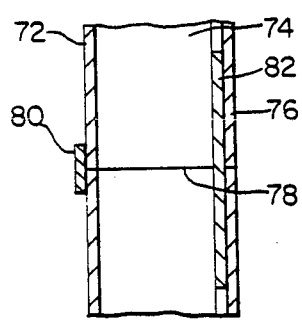
FIG. 7 is a cross-sectional view of the sidewall of a corrugated shipping/display container having a tear strip attached to the inner liner's outer surface; a pre-cut inner liner, corrugated medium, and outer liner; and a wide tape attached to the outer liner's inner surface.
Figure 8:
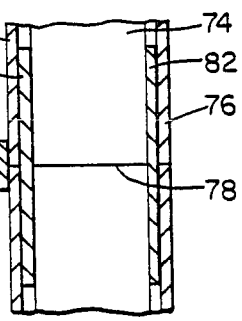
FIG. 8 is a cross-sectional view of the sidewall of a corrugated shipping/display container similar to that shown in FIG. 7 with the addition of a wide tape on the inner liner's inner surface.

The sidewall construction in FIG. 5 is similar to that shown in FIG. 4 with the addition of a wide tape 82 attached to the outer surface of outer liner 78 such that it bridges cut line 78, which provides a means of securing the top cover section above cut line 78 to the lower tray section below cut line 78. When rip cord 80 is pulled to open the carton, cord 80 splits inner liner 72, passes through cut line 78, and splits wide tape 82, thereby separating the top cover section from the bottom tray section. For added strength, another wide tape 84 can be attached to the outer surface of inner liner 72 as shown in FIG. 6. Alternatively, wide tape 82 can be attached to the inner surface of outer liner 76 as shown in FIG. 7, and wide tape 84 can be attached to the inner surface of inner liner 72 as shown in FIG. 8.

Figure 9:
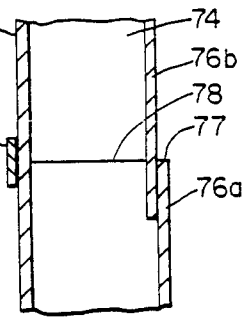
FIG. 9 is a cross-sectional view of the sidewall of a corrugated shipping/display container having a tear strip attached to the inner liner's outer surface, a pre-cut corrugated medium, and a pre-cut and staggered outer liner.

FIG. 9 shows another particularly preferred sidewall wherein the corrugated medium is severed at cut line 78 and rip cord 80 is attached to the outer surface of intact inner liner 72. Outer liner 76 is cut and staggered with the lower section 76a attached to the outer surface of top section 76b such that free edge 77 of lower section 76a is preferably in line with cut line 78. The carton is opened by pulling rip cord 80 which splits inner liner 72, passes through cut line 78 in corrugated medium 74, and splits upper section 76b of outer liner 76, the free edge 77 of lower section 76a serving to guide rip cord 80 along a straight path. The top cover section is then removed to reveal the product inside while the bottom section remains as a display tray.

Figure 10:
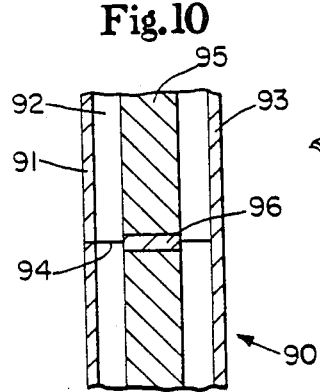
FIG. 10 is a cross-sectional view of the sidewall of a corrugated shipping/display container having a pre-cut inner liner and corrugated medium, an intact outer liner, reinforcing rods placed in the valleys of the corrugated medium, and a continuous rip string wrapped around each rod.
Figure 11:
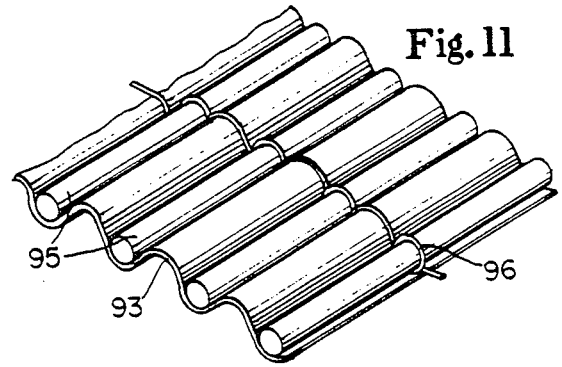
FIG. 11 is a perspective of the sidewall illustrated in FIG. 10 with the inner liner removed to better show the reinforcing rods and rip string.

FIGS. 10 and 11 show another particularly preferred sidewall that exhibits very high compression strength. In FIG. 10, the sidewall generally indicated as 90 includes inner liner 91, corrugated medium 92, and outer liner 93. Inner liner 91 and corrugated medium 92 are pre-cut along cut line 94 while outer liner 93 is preferably left intact but may also be cut. Referring to both FIGS. 10 and 11, high compression/low shear strength rods 95 preferably made of plastic or wood are placed in the valleys of adjacent flutes of corrugated medium 92. If inner liner 91, corrugated medium 92, and outer liner 93 are pre-cut along cut line 94, rods 95 are preferably glued or otherwise secured within the flutes. A continuous rip string 96 is wrapped around each rod 95 and passes thereinbetween. The carton is opened by pulling rip string 96 which snaps each rod 95 and tears outer liner 93, thereby separating the carton into a removeable top cover section and a bottom display tray.

In all embodiments shown in FIGS. 4-11, slitting the liners and corrugated medium and attaching the rip cord and wide tapes or rods and rip string as appropriate are preferably carried out while the liners and corrugated medium are in continuous web form in a high-speed manufacturing setting.

Figure 12:
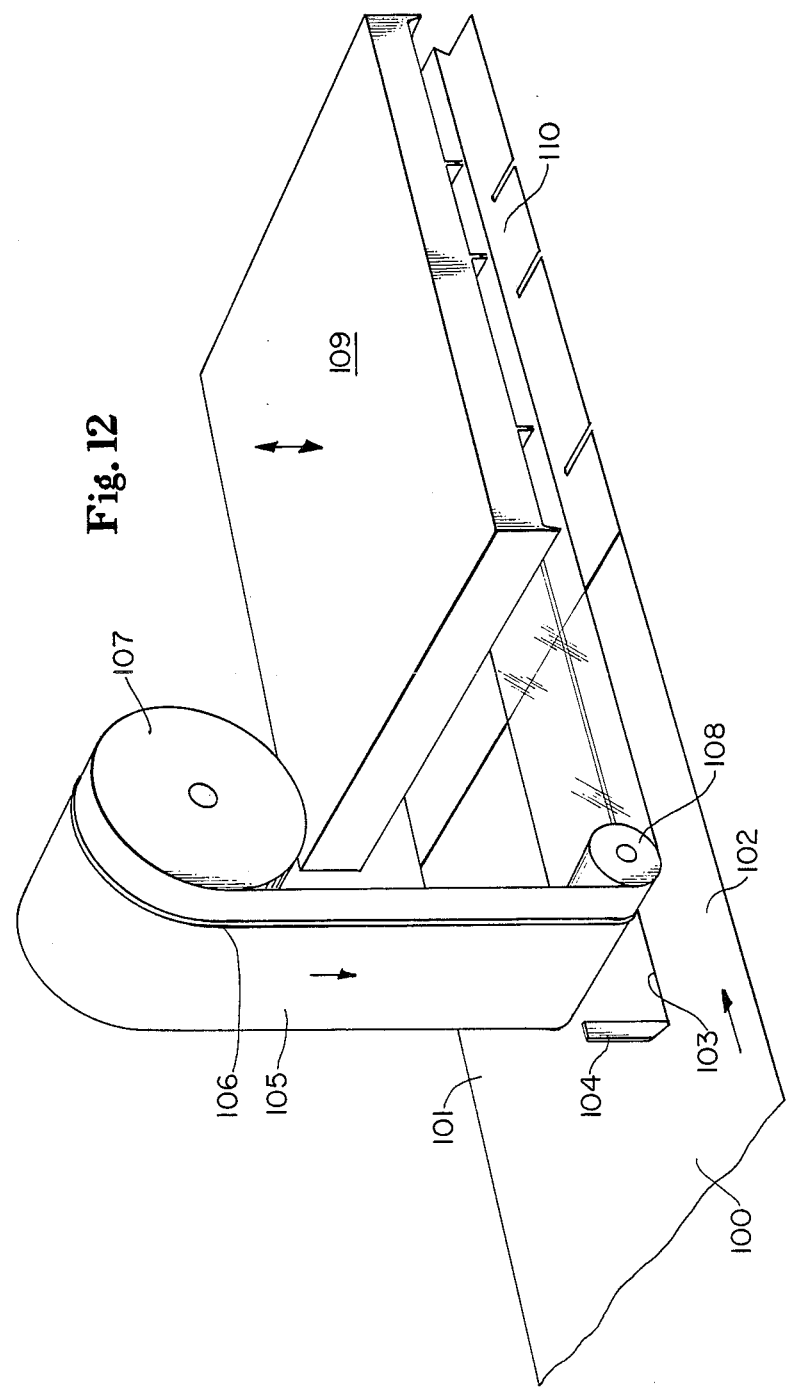
FIG. 12 is a schematic perspective view showing a preferred method of making tear strip openable shipping/display containers of the present invention.

For example, in FIG. 12 there is shown continuous web of corrugated paperboard 100 that is cut into top cover section 101 and bottom tray section 102 with butt joint 103 therebetween by knife 104 as web 100 travels in the direction indicated by the arrow. Immediately after web 100 has been cut in this fashion, continuous web of securing means 105 having tear strip 106 attached thereto is unwound from rollstock 107 and applied to web 100 with pressure roller 108 such that securing means 105 bridges butt joint 103 and tear strip 106 is substantially superimposed over butt joint 103. Downstream from this operation, cutting die 109 reciprocates vertically as indicated by the double arrow to cut individual container blanks 110 from web 100 which can then be immediately erected into individual cartons or shipped elsewhere in blank form for subsequent assembly.

While several particularly preferred embodiments of the present invention have been described and illustrated, it should now be apparent to those skilled in the art that various changes and modifications can be made without departing from the spirit and scope of the invention. In addition, although the preceding description of the present invention is generally addressed to making shipping cartons, the invention can also be applied with equal facility to a wide variety of packaging applications. Accordingly, the following claims are intended to embrace such changes, modifications, and areas of application that are within the scope of this invention.

What is claimed is:

1. A method of making a blank for erecting an easy-open shipping/display container having top, bottom, and side panels, said method comprising the steps of:
    (a) providing a continuous web of corrugated paperboard having an inner liner, a corrugated medium, and an outer liner, each having an outer surface, an inner surface, and a longitudinal axis;
    (b) cutting said web along a line parallel to said longitudinal axis thereby defining a butt joint, said butt joint separating said web into a top cover section and a bottom tray section;
    (c) providing a continuous web of securing means having a continuous strip of splitting means attached thereto;
    (d) attaching said securing means to said outer or said inner surface of said web of corrugated paperboard, said securing means bridging said butt joint, said splitting means being substantially superimposed over said butt joint, whereby said splitting means splits said securing means into a top portion and a bottom portion when pulled, thereby separating said top cover section from said bottom tray section, substantially all of said top portion of said securing means remaining attached to said top cover section and substantially all of said bottom portion of said securing means remaining attached to said bottom tray section; and
    (e) stamping and cutting said blank from said continuous web of corrugated paperboard.

2. The method recited in claim 1 further comprising the step of cutting an access aperture in said web of corrugated paperboard at one end of said butt joint.

3. The method recited in claim 1 wherein said securing means is attached to said outer or said inner surface of said outer liner of said corrugated paperboard.

4. The method recited in claim 1 wherein said securing means is attached to said outer or said inner surface of said inner liner of said corrugated paperboard.

5. The method recited in claim 1 wherein said strip of splitting means is attached to the outer or inner surface of said web of securing means.

6. The method recited in claim 1 further comprising the steps of providing a second continuous web of securing means, and attaching said second web of securing means to said outer or said inner surface of said web of corrugated paperboard, said second web of securing means also bridging said butt joint, whereby said splitting means also splits said second securing means when pulled.

7. A method of making an easy-open shipping/display container having top, bottom, and side panels, said method comprising the steps of:
    (a) providing a continuous web of corrugated paperboard having an inner liner, a corrugated medium, and an outer liner, each having an outer surface, an inner surface, and a longitudinal axis;
    (b) cutting said web along a line parallel to said longitudinal axis thereby defining a butt joint, said butt joint separating said web into a top cover section and a bottom tray section;
    (c) providing a continuous web of securing means having a continuous strip of splitting means attached thereto;
    (d) attaching said securing means to said outer or said inner surface of said web of corrugated paperboard, said securing means bridging said butt joint, said splitting means being substantially superimposed over said butt joint, whereby said splitting means splits said securing means into a top portion and a bottom portion when pulled, thereby separating said top cover section from said bottom tray section, sbustantially all of said top portion of said securing means remaining attached to said top cover section and substantially all of said bottom portion of said securing means remaining attached to said bottom tray section;
    (e) stamping and cutting a blank from said continuous web of corrugated paperboard; and
    (f) folding said blank and closing said top and said bottom end panels to form said container.

8. The method recited in claim 7 further comprising the step of cutting an access aperture in said web of corrugated paperboard at one end of said butt joint.

9. The method recited in claim 7 wherein said securing means is attached to said outer or said inner surface of said outer liner of said corrugated paperboard.

10. The method recited in claim 7 wherein said securing means is attached to said outer or said inner surface of said inner liner of said corrugated paperboard.

11. The method recited in claim 7 wherein said strip of splitting means is attached to the outer or inner surface of said web of securing means.

12. The method recited in claim 7 further comprising the steps of providing a second continuous web of securing means, and attaching said second web of securing means to said outer or said inner surface of said web of corrugated paperboard, said second web of securing means also bridging said butt joint, whereby said splitting means also splits said second securing means when pulled.

* * * * *

UNITED STATES PATENT AND TRADEMARK OFFICE
CERTIFICATE OF CORRECTION

PATENT NO.   : 4,871,345
DATED        : October 3, 1989
INVENTOR(S)  : CHARLES L. WOSABA, II, PETER W. HAMILTON, ROBERT J. KISSNER It is certified that error appears in the above-identified patent and that said Letters Patent is hereby corrected as shown below:

Column 1, line 7, "November 10" should read -- November 20 -- .

Column 2, line 45, "rear" should read -- tear -- .

Column 5, line 9, "AFter" should read -- After -- .

Signed and Sealed this

Eighteenth Day of September, 1990

Attest:

HARRY F. MANBECK, JR.

*Attesting Officer*  *Commissioner of Patents and Trademarks*